US00RE41179E

(19) United States
(12) Reissued Patent
Monnier

(10) Patent Number: US RE41,179 E
(45) Date of Reissued Patent: Mar. 30, 2010

(54) DEVICE FOR EXTRACTING PARAMETERS FOR DECODING A VIDEO DATA FLOW CODED ACCORDING TO AN MPEG STANDARD

(75) Inventor: Philippe Monnier, Villard Bonnot (FR)

(73) Assignee: STMicroelectronics S.A. (FR)

(21) Appl. No.: 10/209,597

(22) Filed: Jul. 30, 2002

Related U.S. Patent Documents

Reissue of:
(64) Patent No.: 6,097,758
Issued: Aug. 1, 2000
Appl. No.: 09/354,952
Filed: Jul. 16, 1999

U.S. Applications:

(63) Continuation of application No. 08/783,917, filed on Jan. 17, 1997, now abandoned.

(30) Foreign Application Priority Data

Jan. 19, 1996 (FR) ..... 96 00809

(51) Int. Cl.
*H04N 7/12* (2006.01)

(52) U.S. Cl. ..... 375/240.01; 348/845.2
(58) Field of Classification Search ..... 375/240.01, 375/240.03, 240.25, 240.26; *H04N 7/12*
See application file for complete search history.

(56) References Cited

U.S. PATENT DOCUMENTS 5,241,382 A * 8/1993 Paik et al. ..... 358/133
5,414,468 A * 5/1995 Lee ..... 348/402
5,579,052 A * 11/1996 Artieri ..... 348/416
5,841,472 A * 11/1998 Rim et al. ..... 348/390
5,847,767 A * 12/1998 Ueda ..... 348/423

FOREIGN PATENT DOCUMENTS

EP 0 506 294 A2 * 9/1992
EP 0 613 303 A2 * 8/1994
EP 0 626 770 A2 * 11/1994
EP 0 685 970 A2 * 12/1995
JP 5108561 * 4/1993

OTHER PUBLICATIONS

"High–Speed Multi–Mater Channel Interface" *IBM Technical Disclosure Bulletin*, vol. 30, No. 11, Apr. 1998, pp. 317–139.*

* cited by examiner

*Primary Examiner*—Young Lee
(74) *Attorney, Agent, or Firm*—David V. Carlson; Lisa K. Jorgenson

(57) ABSTRACT

A device for extracting parameters for decoding a video data flow, contained in headers preceded by a starting code of series of data coded according to an MPEG standard, organized, independently and according to the starting code, and storage of the parameters in three register banks.

15 Claims, 3 Drawing Sheets

DEVICE FOR EXTRACTING PARAMETERS FOR DECODING A VIDEO DATA FLOW CODED ACCORDING TO AN MPEG STANDARD

Matter enclosed in heavy brackets [ ] appears in the original patent but forms no part of this reissue specification; matter printed in italics indicates the additions made by reissue.

This application is a continuation of Ser. No. 08/783,917, filed Jan. 17, 1997 *now abandoned.*

BACKGROUND OF THE INVENTION

1. Field of the Invention

The present invention relates to a device for extracting coding parameters contained in a flow of video data coded according to an MPEG1 or MPEG2 standard.

2. Discussion of the Related Art

The moving pictures expert group (MPEG) standards define conditions for coding and decoding animated images in the form of a digital video data flow and a digital audio data flow. These standards define the coding conditions of the animated images, whether they are associated with a sound signal or not, for their storage and/or their transmission, for example by radio means, as well as the decoding conditions of these images for their reconstitution on a screen. The digitized images are coded in order to decrease the amount of information which represents them. This coding generally uses compression and motion estimate techniques. The MPEG standards are, for example, used for storing image sequences on laser-read disks (compact disks), be they interactive or not, or on recording tapes. They are also used for image transmission, for example, on telephone lines or by radio means.

The coding and decoding conditions, defined by the MPEG standards, are available by standardization agencies, and only the criteria necessary to understand the invention will be indicated.

The decoding of information coded according to one of the MPEG standards uses a separation, by nature, of the information contained in the data flow. The data flow is organized in audio and video system packets. The data flow is demultiplexed to restore, in particular, a video data flow which is stored in an area of a RAM as the video packets appear in the data flow. The video decoding of the data flow is performed, from this video data flow, by a video decoder which is configured, by a microprocessor, according to the coding parameters contained in data series headers of the video data flow.

The present invention more specifically applies to extracting the coding parameters contained in data series headers of a video data flow, for example, extracted from a RAM for decoding.

FIG. 1 shows an example of a video data flow (video bitstream data) coded according to the MPEG1 standard.

A video data flow 1 is, according to the MPEG1 standard, divided in sequences 2 of groups 3 of images 4, each image 4 being divided into sub-images 5.

Each sequence 2 begins with a sequence header SEQ_H 6 preceded by a sequence starting code (sequence header code) SEQ_SC 7. Sequence header 6 contains parameters which are common to all the images of the sequence and which enable to reconfigure the video decoder for each sequence. These are, for example, the pixel outlook, the rate of the data flow, quantization tables, the image size, etc.

Sequence 2 is divided into groups of images 3, header 6 being followed by an image group starting code (group header code) GOP_SC 8. Although only one group 3 has been shown in FIG. 1, several image groups 3, and thus several codes 8, can be present within a same sequence 2. As for the beginning of a sequence 2, each code 8 is followed by a group header GOP_H 9 containing parameters relative to image group 3 and common to all the images in the group.

Group 3 is divided into images 4, the group header 9 being followed by an image starting code (picture header code) PIC_SC 10. Although only one image 4 has been shown in FIG. 1, several images 4, and thus several codes 10, can be present within a same group 3. As for groups 3, each code 10 is followed by an image header PIC_H 11 containing all the information relative to image 4 and common to all the sub-images of the image. Image header 11 notably contains the image type.

An image 4 contains at least one sub-image 5. Image header 11 is followed by a starting code of a first sub-image SCE_SC 12. Each code 12 is followed by the proper video data 13, compressed according to the MPEG1 standard.

In certain cases, more information (not shown) can be contained in video data flow 1. This information is itself preceded by starting codes (not shown). It is, for example, user-directed information, information about possible transmission errors or for the restoring of video data flow 1. It can also be quantization tables associated with an image sequence. According to the MPEG1 standard two quantization tables constituted by two arrays of 64 bytes are required to decode the video data. The quantization tables used for the coding of a sequence can be either standardized tables established by the MPEG1 standard, or tables proper to the sequence and accompanying the sequence.

All starting codes SC, be they of sequences 2, groups 3, images 4, first sub-images 5, or others, have a similar format FIG. 2 shows the shape of a starting code SC according to the MPEG standards. This code SC generally is a code comprising four bytes. Three first bytes 20, 21 and 22 are used to identify the code as a starting code SC, while a fourth byte 23 enables to identify, notably the nature (sequence, group, image, sub-image, or other) of the code SC. In FIG. 2, the bytes have been represented by their hexadecimal values. Thus, the first three bytes 20, 21 and 22 contain, respectively, the values "00", "00", and "01", while the fourth byte 3 contains a value "XX" identifying, notably, the nature of the code SC.

To enable the adjustment of the video decoder to each sequence 2, group 3, or image 4, it is necessary to recognize the occurrence of a new sequence 2 and analyze its header 6 to extract therefrom the parameters necessary to decode the images that it contains. It is also required to be able to recognize the occurrence of a new group 3, of a new image 4 and of a new sub-image 5 and analyze the parameters contained in the header of a group 3 or an image 4.

The analysis of the parameters and the adjustment of the video decoder must be performed before the corresponding proper video data arrive on the decoder.

Conventionally, the extracting of the decoding parameters from a video data flow 1 is performed by software means from a microprocessor contained within the image restoring device.

Video data flow 1 arrives at the input of a logic circuit for detecting starting codes SC. This circuit is implemented to generate an interrupt directed to the microprocessor, upon each occurrence of a starting code SC, be it of a sequence 2, of a group 3, of an image 4, of a sub-image 5, or other. In other words, the logic circuit generates an interrupt upon each occurrence of a byte series "00", "00", "01".

Data flow 1 is stored in a buffer register (FIFO) as it arrives, to be extracted by the microprocessor. The buffer register is read iteratively by the microprocessor which analyzes, by software means, the fourth byte 23 of the starting code SC, the header 6, 9 or 11, and which configures the video decoder accordingly.

Thus, the extracting of the decoding parameters is performed by the microprocessor which must analyze data flow 1 upon each occurrence of a starting code SC.

A disadvantage of conventional circuits is that they need to use a very fast microprocessor to achieve a real time processing of data flow 1. Another disadvantage, especially present when the restoring device is a microcomputer likely to perform other tasks, is that the analysis of headers 6, 7 or 8 monopolizes the microprocessor. The microcomputer is then no longer available to execute other programs, if it wants to achieve a desired image defiling speed. Indeed, to achieve the desired defiling speed, the interruptions generated by the logic circuit for detecting starting codes should have a relatively high priority. Now, these interrupts are generated for each starting code SC contained in video data flow 1. Further, when a sequence contains its own quantization tables, the microprocessor must organize the storage of these tables so that they are available for the entire image sequence. If the standardized tables conventionally reside within the restoring device, the volume of these tables (two arrays of 64 bytes) results in the monopolizing of the microprocessor, when a sequence contains its own tables, by the processing, byte after byte, of video data flow 1 to organize its storage.

SUMMARY OF THE INVENTION

The present invention aims at providing a device which enables to extract, from the video data flow, the parameters for decoding the data without using the microprocessor.

The present invention also aims to enabling a storage of the possible quantization tables without using the microprocessor.

To achieve these objects, the present invention provides a device for extracting video data decoding parameters, contained in headers preceded by a starting code of a data series coded according to an MPEG standard, including means for organizing, independently and according to the starting code, a storage of the parameters in three register banks.

According to an embodiment of the present invention, the device includes a starting code detector, implemented in wired logic and associated with a state machine for branching the contents of the headers to the register banks according to the starting code detected.

According to an embodiment of the present invention, the state machine includes means for recognizing the occurrence of quantization tables in the data flow and for branching the data relative to these tables to a circuit for restoring quantization arrays.

According to an embodiment of the present invention, the state machine is associated with a calculator for converting the data contained in the headers, prior to their storage in one of the three register banks, into instructions directly interpretable by a video decode and accessible in any order by a microprocessor.

According to an embodiment of the present invention, the detector is associated with a status register, accessible by a microprocessor and meant for containing the starting code detected.

According to an embodiment of the present invention, the detector is associated with interrupt and stop registers for configuring its operating mode.

According to an embodiment of the present invention, in an automatic operating mode, the detector generates an interrupt for the microprocessor, only when all decoding parameters have been stored in the three register banks.

According to an embodiment of the present invention, in a manual operating mode, the detector generates an interrupt for the microprocessor, upon each occurrence of a starting code in the data flow.

One advantage of the present invention is that the different headers are separated and the information contained in those headers are translated into instructions for the video decoder without interrupting the microprocessor.

The foregoing and other objects, features and advantages of the present invention will be discussed in detail in the following description of specific embodiments, taken in conjunction with the accompanying drawings, but not limited by them.

DETAILED DESCRIPTION

Figure 1:
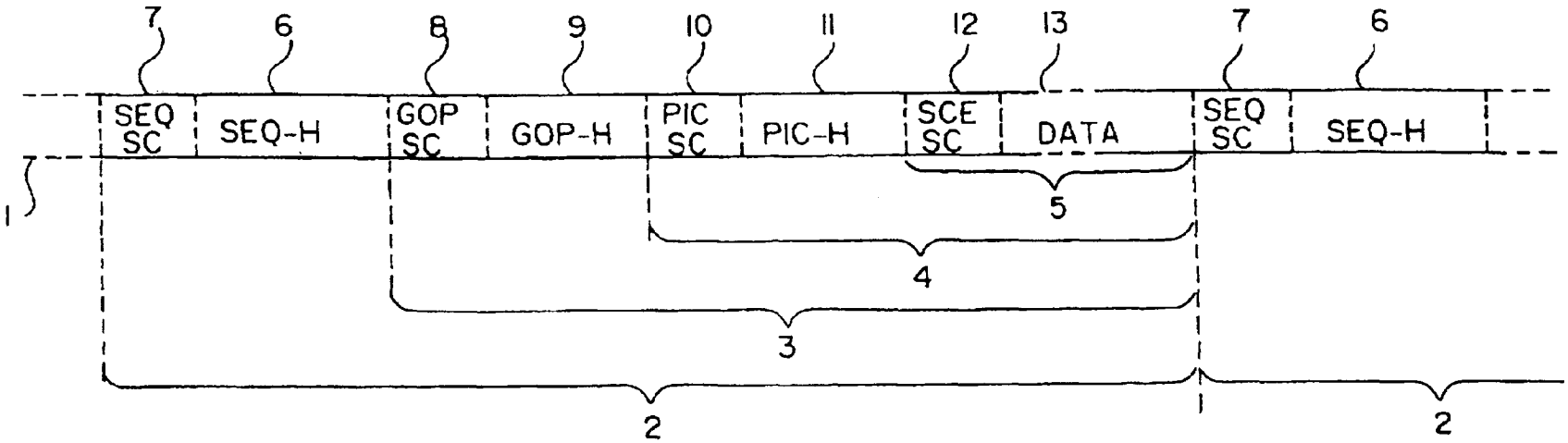
Fig 1 (Prior Art)
FIGS. 1 and 2, previously described, illustrate the shape of a flow of video data coded according to the MPEG1 standard.

For clarity, the same components have been referred to by the same references in the different drawings. Similarly, only the components and connections necessary to the understanding of the invention have been shown in the drawings.

Figure 3:
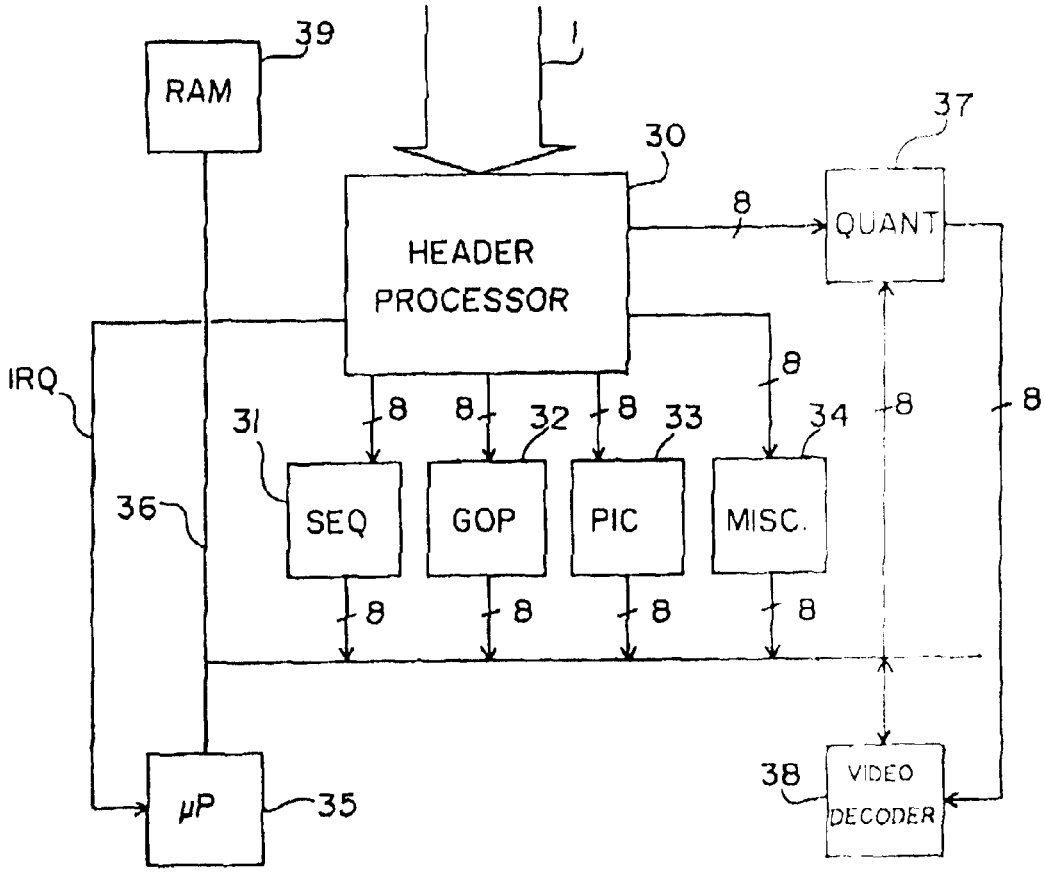
FIG. 3 shows, in the form of block-diagrams, an embodiment of an architecture of an MPEG video decoder provided with a device for extracting parameters for decoding a flow of data coded according to the MPEG1 standard, according to the present invention.

FIG. 3 schematically shows an embodiment of an architecture of an MPEG1 video decoder provided with an extracting device (HEADER_PROCESSOR) 30 according to the present invention.

Figure 2:
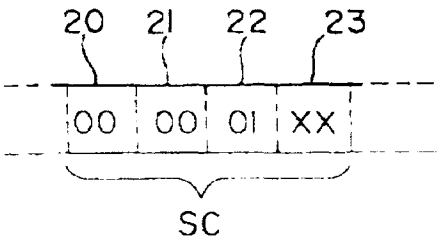
Fig 2 (Prior Art)

Device 30 receives, for example over eight bits, a video information flow 1 coded according to the MPEG1 standard. Data flow 1 includes, as has been discussed in relation with FIGS. 1 and 2, sequences of image groups.

The function of device 30 is, according to the invention, to demultiplex data flow 1 to distribute, in three register banks 31, 32 and 33, the headers, respectively 6, 9 and 11 (FIG. 1) of sequences 2, groups 3 and images 4, and, in a fourth register bank 34, sub-images 5. The fourth register bank MISCELL 34 contains other information likely to be contained in data flow 1, for example, error or user-directed information.

A characteristic of the present invention is that it organizes a temporary storage of the headers in register banks SEQ 31, GOP 32 and PIC 33 accessible, in the read mode, by a microprocessor μP, via a bus 36.

Figure 4:
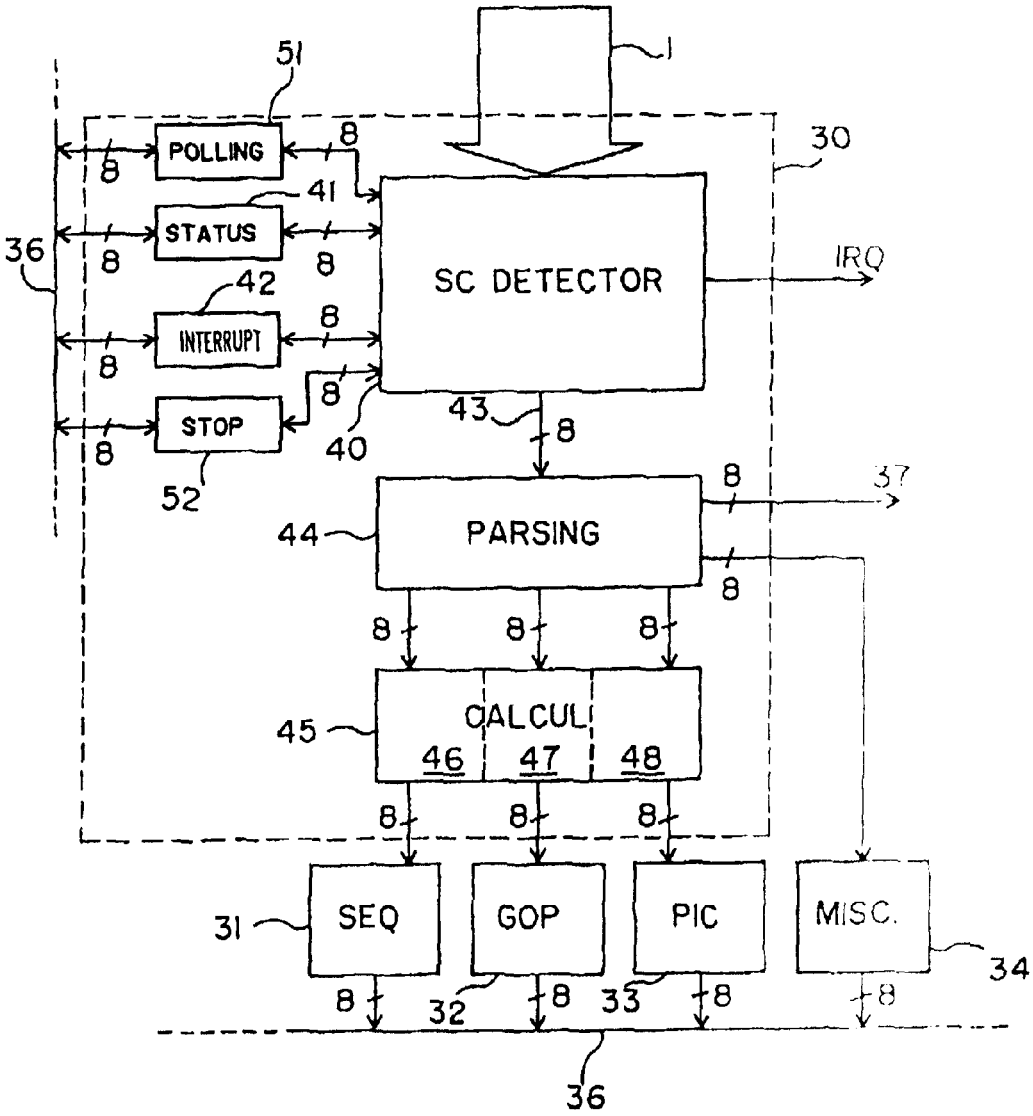
FIG. 4 shows, in the form of block diagrams, an embodiment of a device for extracting parameters for decoding a flow of data coded according to the MPEG1 standard, according to the present invention.

According to the invention, the demultiplexing is performed independently, that is, without using microprocessor 35, as will be seen in relation with FIG. 4.

Device 30 also includes, according to the invention, means for identifying the occurrence of quantization tables contained in data flow 1. The data relative to these tables are then, according to the invention, sent to a circuit QUANT 37 for restoring the arrays constitutive of these tables. Circuit 37 is a conventional circuit for delivering, to a video decoder 38, the quantization arrays of the data to be decoded. Circuit 37 restores the quantization arrays, either from the standardized tables that it extracts from a RAM 39, or from tables contained in video data flow 1.

According to the invention, device 30 generates an interrupt IRQ, directed to microprocessor 35, to notify that the parameters associated with the decoding of the video data are available.

Thus, according to the invention, the microprocessor is not interrupted during the arrival of all the headers, whether of sequence, group or image. It is interrupted, preferably, only when a first sub-image 5 arrives, to indicate that the data can be decoded by decoder 38 according to the information, or instructions, contained in registers 31, 32 and 33.

FIG. 4 schematically shows an embodiment of an extracting device 30 according to the invention.

Device 30 includes, according to the invention, a circuit SC_DETECTOR 40 for detecting starting codes SC. This detector 40 is implemented in wired logic and is, according to the invention, associated with a stop control register 52, with a status register 41, with a register 51 for polling the bit flow and with interrupt management register 42.

The function of register 41 is to contain the starting code SC identified by detector 40. This register 41 and register 51 are accessible, in the read mode, by microprocessor 35 in a so-called manual operating mode which will be described hereafter.

The function of registers 42 and 52 is, according to the invention, to enable the masking of some interrupts generated by detector 40. Although registers 42 have been shown as a single block, they are in fact constituted by an interrupt state register and a mask register, programmable by microprocessor 35. Registers 42 and 52 are accessible by microprocessor 35 and enable to configure the operating mode of device 30 by choosing, as will be seen hereafter, which starting codes lead to an interrupt.

A data output 43 of detector 40 reissues the video data flow to a state machine PARSING 44 for branching the data contained in flow 1 to the different register banks 31, 32, 33 and 34 and to circuit 37 of FIG. 3.

The function of this state machine 44 is, in the so-called automatic operating mode, to branch the data, according to a control signal (not shown) that it receives from detector 40 and which notifies it the destination of the data.

According to the invention, the data relative to headers 6, 9 and 11 flow through, preferably, a logic calculator CALCUL 45 before being stored in registers 31, 32 and 33. This calculator 45 is meant to analyze the headers to convert them into instructions, directly interpretable by video decoder 38 (FIG. 3), which are stored in registers 31, 32 and 33.

An advantage of the present invention is that by so separating the different headers, the information contained in these headers can now be translated into instructions for decoder 38 of the proper video data, without using microprocessor 35. When device 30 is in automatic operation, microprocessor 35 can thus, according to the invention, be not only relieved of the load of identifying the different headers, but also from converting these headers.

Calculator 45 is constituted by three distinct logic entities, respectively 46, 47 and 48, each only receiving from state machine 44 the headers that they have to convert. Each entity 46, 47 or 48 issues the instructions calculated at the register bank, respectively 31, 32 or 33, with which it is associated. The practical implementation of calculator 45 depends on the MPEG1 standard or MPEG2 to which it is applied. In one embodiment, each header data bitstream is broken into a plurality of parameters, one for each register, by a shift register and are routed to a respective register in a corresponding register unit 31–34.

All the data of flow 1 which do not correspond to these headers are not used. The quantization tables, if they exist, are included in header 6 according to the MPEG1 standard. Their presence is detected by the location of 2 bits in the header.

In practice, detector 40 and calculator 45 can be one with state machine 44. Indeed, all these components are circuits implemented in wired logic. The practical implementation of these circuits is within the reach of those skilled in the art according to the functional indications given in the present description.

It should be noted that the starting codes SC are not stored in the different registers. Indeed, detector 40 can only identify a starting code upon occurrence of the fourth byte 23 of the code. State machine 44 can thus only branch data flow 1 at the end of a starting code SC. This is compatible with the operation of an MPEG decoder. Indeed, the starting codes are conventionally used, by the microprocessor, to identify which type of data (sequence, group, image, sub-image, error or other header) follows this code SC. Since the data are, according to the invention, distributed independently from microprocessor 35, these codes SC are no longer useful once the data and information are in register banks 31, 32, 33.

Device 30 can, according to the invention, operate either in automatic mode, or in manual mode.

In automatic mode, detector 40 generates an interrupt IRQ directed to microprocessor 35 only upon occurrence of a starting code SCE_SC indicative of the occurrence of a first sub-image 5.

Thus, microprocessor 35 is interrupted only once when all decoding parameters have been extracted from data flow 1 and are contained in register banks 31, 32 and 33.

In manual mode, detector 40 generates an interrupt for each starting code SC defined, in register 52. This code is stored in register 51. State machine 44 and calculator 45 are not used in the manual mode. Microprocessor 35 reads register 51 and analyzes, conventionally, the data contained in the data flow. Registers 31, 32, 33 and 34 are, in this cask, directly filled by microprocessor 35.

Other intermediary operating modes can be provided by appropriately modifying the contents of interrupt mask register 42 and register 52. For example, unmasking of art interrupt relative to the occurrence of an error starting code can be provided.

It can thus be acknowledged that, while enabling to limit microprocessor interrupt upon occurrence of a starting code SCE_SC of a first sub-image 5, the present invention enables to reproduce conventional operation by interrupting microprocessor 35 for each starting code SC. The present invention thus adapts to different operating modes, selected by the user, for video data decoding.

It should be noted that all the components of device 30 are synchronized, by means of timing marks extracted, conventionally, from the data flow.

The different write and read control signals in the registers have not been shown, for clarity. Their implementation is within the reach of those skilled in the art according to the functional indications given hereabove.

The sizing of register banks 31, 32, 33 is chosen according to the maximum number of elements contained in each header. For example, register bank 33 only contains data linked with the image which is about to be decoded. For the MPEG1 20 standard, register bank 33 includes four registers of different sizes containing, for example and respectively, 10 bits for a time reference (temporal_reference) 3 bits for the type of image (picture_coding_type), 16 bits for the size of the video register (vbv_delay) and 8 bits for the motion vectors (extra_information_picture). This information is updated after each image decoding. A specific implementation of the state machine 44, calculator 45 and register units 31–34 will depend on the type of the video bitstream data 1. One of ordinary skill in the art would be able to use the specification of a particular video bitstream type and the description of the present invention in the specification herein to practice the invention. One example of the specification for MPEG1 and MPEG2 is "Video Demystified," second edition, 1996, by Keith Jack and published by HighText Interactive, Inc. of San Diego, Calif., which is incorporated herein by reference.

Of course, the present invention is likely to have various alterations, modifications and improvements which will readily occur to those skilled in the art. In particular, the components described can be replaced by one or several elements performing the same function. Moreover, although the decoding parameter extracting device has been described referring to the MPEG1 standard, the present invention also applies to a flow of data coded according to the MPEG2 standard. For this purpose, it is only necessary to adapt detector 40, state machine 44 and calculator 45. Such an adaptation is within the abilities of those skilled in the art based on the characteristics of the MPEG2 standard specified by the standardization agencies. Further, the size of the different registers depends on the features, especially on the processing speed, of the MPEG decoder with which the demultiplexing device according to the present invention is associated. Similarly, the present invention applies whatever the number of bits over which the data are coded by accordingly adapting the different components of the device.

Such alterations, modifications and improvements are intended to be part of this disclosure and are intended to be within the spirit and scope of the invention. Accordingly, the foregoing description is by way of example only and is not intended to be limiting. The invention is limited only as defined in the following claims and the equivalent thereto.

What is claimed is:

1. In a computer system having a processor executing at least one application program and a video decoder decoding [a] video data for display, an extraction circuit for extracting from the video data a plurality of header data each associated with one of a plurality of starting code types, the extraction circuit comprising:

a starting code detector receiving the video data, and operable to detect a starting code contained in the video data while the processor is executing the application program and operable to prevent an interrupt from being passed to the processor when a starting code is detected;

a branch circuit having an input connected to the starting code detector, and operable to branch the header data associated with the detected starting code type, and a plurality of register units connected to the branch circuit for receiving the branched header data[, each register unit being associated with one of the plurality of starting code types and each operable to store the header data associated with the register unit];

wherein the branch circuit includes means for recognizing the occurrence of quantization tables in the video data and for branching the data relative to these tables to a circuit for restoring quantization arrays, wherein the branch circuit is associated with a calculator for converting the header[,] data [prior to their storage in one of the register units,] into instructions directly interpretable by a video decoder and accessible in any order by a microprocessor; and wherein the starting code detector generates an interrupt for the processor when all header data are stored in the plurality of register units.

2. The extraction circuit according to claim 1, [further comprising a calculator connected to the branch circuit and the plurality of register units, and operable to convert the header data into parameters usable by the video decoder and] *wherein* each register unit [stores the parameters] *is associated with one of the plurality of starting code types and is operable to store header data* associated with the register unit*, wherein the calculator is connected to the plurality of register units, and is operable to convert the header data into parameters usable by the video decoder and each register unit stores the parameters associated with the register unit.*

3. The extraction circuit according to claim [1] *2* wherein the plurality of register units includes [3] *three* register units respectively storing information related to a sequence header, group header and image header.

4. In a computer system having an application processor executing at least one application program and a video decoder decoding a video bitstream data for display, an extraction circuit for extracting from the video bitstream data a plurality of header data each associated with one of a plurality of header code types, the extraction circuit comprising, a plurality of register units each associated with one of the plurality of header code types; and a header processor having an input receiving the video bitstream data and an output connected to the plurality of register units, the header processor operable to detect a header code contained in the video bitstream data and upon detection route the associated header data to its output for storage by the register unit associated with the detected header code type, the header processor performing the detection and routing while the application processor is executing the application program; wherein the header processor includes:

means for recognizing the occurrence of quantization tables in the data flow and for branching the data relative to these tables to a circuit for restoring quantization arrays, a calculator for converting the data contained in the headers, prior to their storage in one of the register units, into instructions directly interpretable by a video decoder and accessible in any order by a microprocessor; and a starting code detector that generates an interrupt for the application processor when all header data are stored in the plurality of register units.

5. In a computer system having a processor executing a plurality of programs and a video decoder decoding a video data for display, a method of extracting from the video data a plurality of header data each associated with a starting code, the method comprising the steps of:

receiving the video data containing the plurality of header data and the associated starting codes;

repeating the following steps at least two times independent of the processor:

detecting a starting code in the received video data;

routing the associated header data to an associated one of a plurality of register units according to the detected starting code type; and storing the associated header data in the associated register unit;

recognizing the occurrence of quantization tables in the video data and branching the data relative to these tables to a circuit for restoring quantization arrays;

converting the header data, prior to their storage in one of the register units, into instructions directly interpretable by a video decoder and accessible in any order by a microprocessor, and interrupting the processor when all header data are stored in the plurality of register units.

6. The method according to claim 5, prior to the step of storing, further comprising the step of converting the associated header data into parameters usable by the video decoder wherein each register unit stores the parameters of the associated header data.

7. A device for extracting parameters for decoding a video data flow, contained in headers coded according to an MPEG standard, said headers being preceded by a starting code, said device comprising:

[means for organizing, independently and according to the starting code, a storage of the parameters in] three register banks *for storing the parameters*;

a starting code detector[, implemented in wired logic];

a state machine, associated with the starting code detector, [for branching the contents of the headers to the register banks according to the starting code detected;] wherein the state machine includes means for recognizing the occurrence of quantization tables in the data flow and for branching the data relative to thee tables to a circuit for restoring quantization arrays;

a calculator, associated with the state machine, for converting the data contained in the headers, prior to their storage in one of the three register banks, into instructions directly interpretable by a video decoder and accessible in any order by a microprocessor; and wherein, in an automatic operating mode, the detector generates an interrupt for the microprocessor, only when all decoding parameters have been stored in the three register banks.

8. A device according to claim 7 wherein the detector is associated with a status register, accessible by a microprocessor and meant for containing the starting code detected.

9. A device according to claim 8 wherein the detector is associated with interrupt and stop registers for configuring its operating mode.

10. A device according to claim 9 wherein, in a manual operating mode, the detector generates an interrupt for the microprocessor, upon each occurrence of a starting code in the data flow.

*11. The extraction circuit according to claim 4 wherein the plurality of register units includes three register units respectively storing information related to a sequence header, group header, and image header.*

*12. The extraction circuit according to claim 4, further comprising a status register, associated with wherein the header processor, accessible by a microprocessor, and meant for containing the starting code detected.*

*13. The extraction circuit according to claim 4 further comprising interrupt and stop registers, associated with the header processor, for configuring its operating mode.*

*14. The extraction circuit according to claim 4 wherein, in a manual operating mode, the header processor generates an interrupt for the microprocessor, upon each occurrence of a starting code in the data flow.*

*15. The device of claim 7 wherein said headers are preceded by a starting code, the device further comprising:*

*means for organizing, independently and according to the starting code, a storage of the parameters in a plurality of register banks;*

*wherein the starting code detector is implemented in wired logic; and*

*wherein the state machine is for branching the contents of the headers to the register banks according to the starting code detected.*

* * * * *